(12) United States Patent
Du et al.

(10) Patent No.: US 10,983,825 B2
(45) Date of Patent: Apr. 20, 2021

(54) PROCESSING FOR MULTIPLE CONTAINERS ARE DEPLOYED ON THE PHYSICAL MACHINE

(71) Applicant: HUAWEI TECHNOLOGIES CO., LTD., Guangdong (CN)

(72) Inventors: Yufang Du, Shenzhen (CN); Yangyang Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 16/287,218

(22) Filed: Feb. 27, 2019

(65) Prior Publication Data

US 2019/0196864 A1  Jun. 27, 2019

Related U.S. Application Data

(63) Continuation of application No. PCT/CN2017/098782, filed on Aug. 24, 2017.

(30) Foreign Application Priority Data

Aug. 29, 2016 (CN) .......................... 201610754545.0

(51) Int. Cl.
  *G06F 9/46* (2006.01)
  *G06F 9/48* (2006.01)
  (Continued)

(52) U.S. Cl.
  CPC ............ *G06F 9/485* (2013.01); *G06F 3/0604* (2013.01); *G06F 3/0644* (2013.01);
  (Continued)

(58) Field of Classification Search
  CPC ....... G06F 9/485; G06F 3/0604; G06F 3/0644
  See application file for complete search history.

(56) References Cited

U.S. PATENT DOCUMENTS 6,047,343 A * 4/2000 Olarig ................. G06F 13/4081
                                                    710/302
6,192,417 B1 * 2/2001 Block ................. H04L 12/1818
                                                    370/390

(Continued)

FOREIGN PATENT DOCUMENTS

CN         1791034 A      6/2006
CN       102857363 A      1/2013
                (Continued)

OTHER PUBLICATIONS

Extended European Search Report issued in European Application No. 17845301.5 dated Oct. 8, 2019, 9 pages.

(Continued)

*Primary Examiner* — Camquy Truong
(74) *Attorney, Agent, or Firm* — Fish & Richardson P.C.

(57) ABSTRACT

This application provide a method of processing a process in a container. The method is used in a physical machine, multiple containers are deployed on the physical machine, the physical machine includes a watchdog drive, and the method includes: receiving, by the watchdog drive, a first operation instruction of a first container by using a dev which is a device file, where the first operation instruction includes a first process identification PID, and the first PID represents that the first operation instruction is delivered by a first process in the first container; determining, according to the first PID, first namespace corresponding to the first container; and deleting all processes in the first container according to the first namespace.

20 Claims, 4 Drawing Sheets

(51) Int. Cl.
*G06F 11/30* (2006.01)
*G06F 11/07* (2006.01)
*G06F 3/06* (2006.01)

(52) U.S. Cl.
CPC .......... *G06F 3/0664* (2013.01); *G06F 3/0673* (2013.01); *G06F 11/0712* (2013.01); *G06F 11/0757* (2013.01); *G06F 11/30* (2013.01); *G06F 2209/481* (2013.01); *G06F 2209/483* (2013.01)

(56) References Cited

U.S. PATENT DOCUMENTS

| | | |
|---|---|---|
| 2002/0184482 A1 | 12/2002 | Lacombe et al. |
| 2008/0098205 A1 | 4/2008 | Dolve et al. |
| 2014/0101489 A1 | 4/2014 | Yang |
| 2014/0173618 A1 | 6/2014 | Neuman et al. |
| 2014/0324776 A1* | 10/2014 | Novak ................ G06F 16/1744 707/624 |
| 2014/0372788 A1 | 12/2014 | Vavrick et al. |
| 2015/0033072 A1 | 1/2015 | Barr et al. |
| 2016/0078342 A1 | 3/2016 | Tang |
| 2016/0239369 A1 | 8/2016 | Xie et al. |
| 2017/0249177 A1* | 8/2017 | Liggitt ..................... G06F 8/38 |
| 2018/0210801 A1 | 7/2018 | Wu et al. |

FOREIGN PATENT DOCUMENTS

| | | |
|---|---|---|
| CN | 104915263 A | 9/2015 |
| CN | 105389243 A | 3/2016 |
| CN | 105550576 A | 5/2016 |
| CN | 105677501 A | 6/2016 |
| KR | 20090072742 A | 7/2009 |

OTHER PUBLICATIONS

Office Action issued in Chinese Application No. 201610754545.0 dated Jun. 18, 2020, 10 pages.

PCT International Search Report and Written Opinion issued in International Application No. PCT/CN2017/098782 dated Nov. 27, 2017, 20 pages (with English translation).

* cited by examiner

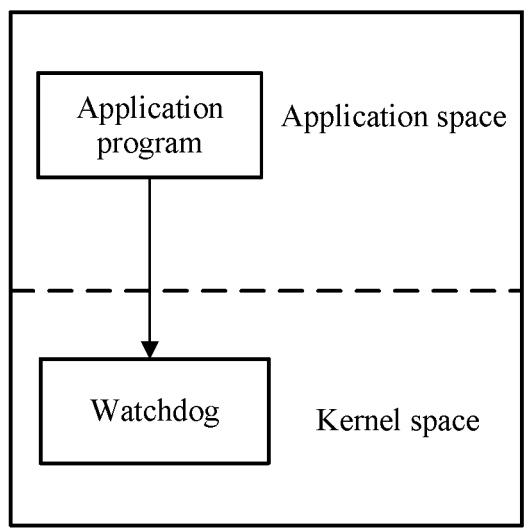

| A watchdog drive receives a first operation instruction of a first container by using a device file dev, where the first operation instruction includes a first process identification PID, and the first PID represents that the first operation instruction is delivered by a first process in the first container | 210 |

| Determining, according to the first PID, first namespace corresponding to the first container | 220 |

| deleting all processes in the first container according to the first namespace | 230 |

FIG. 2

PROCESSING FOR MULTIPLE CONTAINERS ARE DEPLOYED ON THE PHYSICAL MACHINE

CROSS-REFERENCE TO RELATED APPLICATIONS

This application is a continuation of International Application No. PCT/CN2017/098782, filed on Aug. 24, 2017, which claims priority to Chinese Patent Application No201610754545.0, filed on Aug. 29, 2016. The disclosures of the aforementioned applications are hereby incorporated by reference in their entireties.

TECHNICAL FIELD

This application relates to the information processing field, and more specifically, to a process processing method and apparatus in a container.

BACKGROUND

A container is a kernel virtualization technology and can provide lightweight virtualization, so as to separate a process from a resource. Docker is the most popular container technology at the present.

A watchdog drive is used to ensure normal system running. A system regularly resets a watchdog timer (in the other word, feed the watchdog) of the watchdog drive. When the system is faulty, the watchdog timer may be not reset for a long time. In this case, the watchdog drive can restart the system.

Currently, an operating system has only one watchdog drive, and the watchdog drive can delete all processes merely in terms of the entire system. Therefore, only reliability of an entire system level can be ensured. However, with the development of telecommunications services, container technologies become increasingly popular. When a running program is running in a container, it is expected that the watchdog drive can delete all processes in one container.

SUMMARY

Embodiments of this application provide a method of processing a process in a container, so as to delete all processes in the container.

According to a first aspect, a method of processing a process in a container is provided, and the method is used in a physical machine, multiple containers are deployed on the physical machine, the physical machine includes a watchdog drive, and the method includes: receiving, by the watchdog drive, a first operation instruction of a first container by using a dev which is a device file, where the first operation instruction includes a first process identification PID, and the first PID represents that the first operation instruction is delivered by a first process in the first container; determining, according to the first PID, first namespace corresponding to the first container; and deleting all processes in the first container according to the first namespace.

It should be understood that, an operation of the first container includes at least one of the following: a read operation, a write operation, an open operation, a close operation, or an ioctl operation.

Therefore, the watchdog drive determines namespace of a specified container, and can delete all processes in the specified container according to the namespace, thereby implementing container-granularity process processing.

With reference to the first aspect, in on embodiment, before the deleting all processes in the first container according to the first namespace, the method further includes: establishing, according to the first namespace, a first watchdog instance associated with the first container, where the first watchdog instance is used to delete all the processes in the first container, and the first watchdog instance includes a first timer.

It should be understood that the watchdog drive may include multiple watchdog instances, and each watchdog instance is used to process a container process corresponding to the watchdog instance itself.

With reference to the first aspect and the foregoing implementation, in on embodiment, the watchdog drive includes the first watchdog instance, the first watchdog instance includes the first timer, and the deleting all processes in the first container according to the first namespace includes: when a second operation instruction sent by the first container is not received within preset duration of the first timer, deleting all the processes in the first container.

It should be understood that when the second operation instruction sent by the first container is not received within the preset duration of the first timer, all the processes in the first container are deleted. The second operation instruction may represent any operation instruction sent by the first container, that is, if any operation instruction sent by the first container is not received within the preset duration of the first timer, the first watchdog instance instructs a processor to delete all the processes in the first container.

With reference to the first aspect and the foregoing implementations, in on embodiment, before the deleting all processes in the first container according to the first namespace, the method further includes: when a third operation instruction of the first container is received within the preset duration of the first timer, resetting the first timer.

It should be understood that the third operation instruction is any operation instruction delivered by the first container, that is, a trigger condition of the first timer for restarting timing is: The first watchdog instance receives an operation instruction of the first container.

With reference to the first aspect and the foregoing implementations, in on embodiment, the method further includes: when the first timer times out, or when an exit instruction sent by the first container is received, deleting the first watchdog instance.

With reference to the first aspect and the foregoing implementations, in on embodiment, after the deleting all processes in the first container, the method further includes: receiving, by using the dev, which is a device file, a fourth operation instruction that is sent after the first container is restarted, where the fourth operation instruction includes a second process identification PID, and the second PID represents that the fourth operation instruction is delivered by a second process in the first container; determining, according to the second PID, second namespace corresponding to the restarted first container; and establishing, according to the second namespace, a second watchdog instance associated with the restarted first container, where the second watchdog instance includes a second timer, and the second watchdog instance is used to delete all processes in the restarted first container when the second timer times out.

It should be understood that the fourth operation instruction is any operation instruction sent by the restarted first container.

With reference to the first aspect and the foregoing implementations, in on embodiment, the watchdog drive further includes a third watchdog instance, the third watchdog instance includes a third timer, the third timer is associated with a third container in the multiple containers, and the third watchdog instance is used to determine, according to a third process identification PID delivered by the third container, third namespace corresponding to the third PID, and delete all processes in the third container according to the third namespace.

Therefore, without affecting a process in another container, the watchdog instance of the watchdog drive can delete all processes in a specified container by processing the corresponding container, thereby implementing container-granularity process processing.

In addition, because all containers in at least one container send an operation instruction to the watchdog drive by using a same dev, which is a device file, it can be avoided that multiple dev, which is a device files and multiple watchdog drives are required to implement container-level process processing.

According to a second aspect, a process processing apparatus is provided, including: a receiving unit and a processing unit. The apparatus is configured to perform the method in any one of the first aspect or the possible implementations of the first aspect.

According to a third aspect, an apparatus is provided, including: a processor and a memory. The processor and the memory are connected by using a bus system. The memory is configured to store an instruction, and the processor is configured to execute the instruction stored in the memory, so that the apparatus performs the method in any one of the first aspect or the possible implementations of the first aspect.

According to a third aspect, a computer readable medium is provided, where the computer readable medium is configured to store a computer program. The computer program includes an instruction used to perform the method in any one of the first aspect or the possible implementations of the first aspect.

BRIEF DESCRIPTION OF DRAWINGS

The following briefly describes accompanying drawings that need to be used in embodiments of this application.

FIG. 1 is a schematic diagram of an application scenario according to an embodiment of this application;

FIG. 2 is a schematic flowchart of a process processing method according to an embodiment of this application;

DESCRIPTION OF EMBODIMENTS

Figure 3:
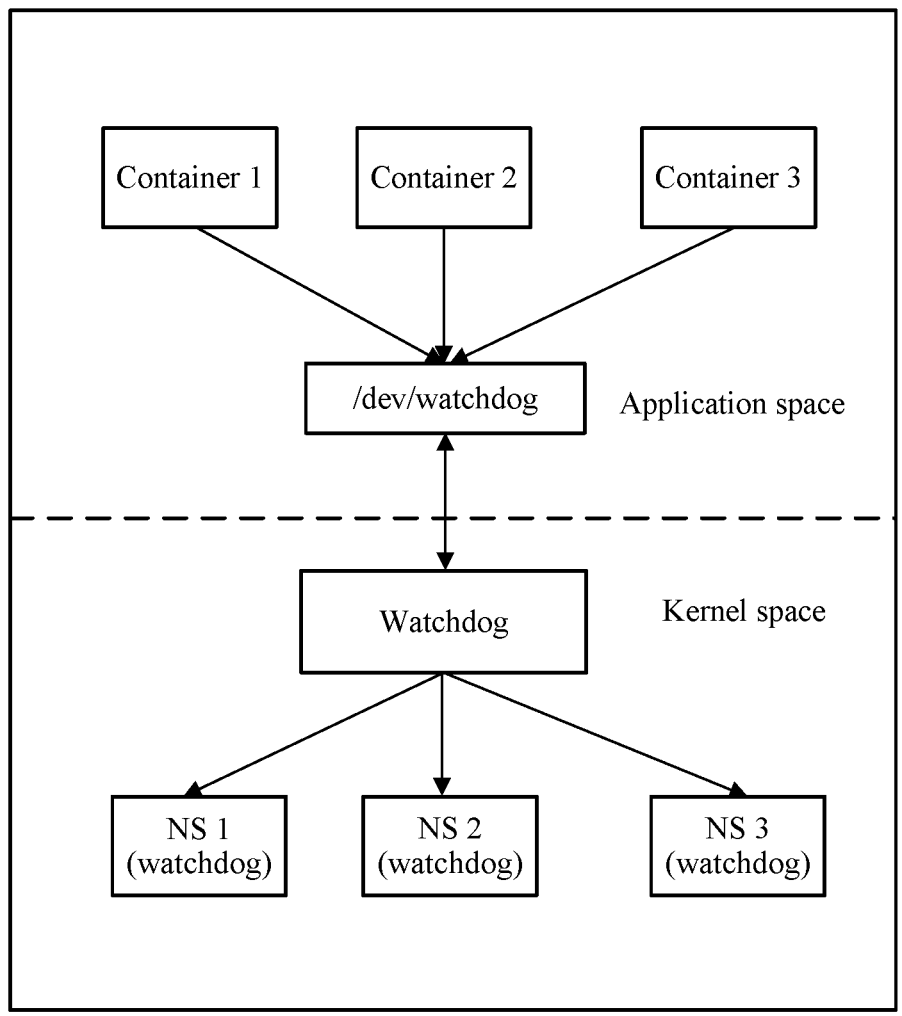
FIG. 3 is a schematic structural block diagram of a process processing method according to an embodiment of this application.

FIG. 1 is a schematic diagram of an application scenario according to an embodiment of this application.

As shown in FIG. 1, a Linux system has a watchdog drive, and the watchdog drive is configured to monitor running of the system and is located in kernel space. A user program in user space communicates with the watchdog drive by using a dev which is a device file. Specifically, once the user program enables /dev/watchdog device, the watchdog drive is enabled to enable a timer (one minute by default) in the kernel space. Afterward, the user program needs to ensure that data is written into a dev, which is a device file within one minute. A process in which a user device regularly writes data into the dev, which is a device file is a process of regularly resetting a watchdog timer of the watchdog drive (the watchdog drive can be shorthanded as watchdog). Each time the user program resets the watchdog timer, the timer of the watchdog drive is reset, and counting is restarted.

It should be understood that the foregoing value of one minute is merely an example, and this application is not limited thereto.

When the user program does not reset the watchdog timer of the watchdog within one minute, the timer restarts the system. Therefore, by means of this mechanism of regularly resetting the watchdog timer, it can be ensured that a core process of the system is in a running state at most of the time. Even if the system process is crashed in a particular case, and regularly resetting the watchdog timer cannot be normally performed, the system can still be restarted with the help of the watchdog drive program, to enable the core process to rerun. In this manner, it can be ensured that a system service normally runs.

However, currently, an operating system has only one watchdog drive, and the watchdog drive can delete all processes merely in terms of the entire system. Therefore, only reliability of an entire system level can be ensured. However, with the development of telecommunications services, container technologies become increasingly popular. When a running program is running in a container, it is expected that the watchdog drive can delete all processes in one container.

FIG. 2 is a schematic flowchart of a process processing method according to an embodiment of this application. The method in this embodiment of this application is used in a physical machine, multiple containers are deployed on the physical machine, and the physical machine includes a watchdog drive. As shown in FIG. 2, the method includes:

Step 210: The watchdog drive receives a first operation instruction of a first container by using a dev which is a device file, where the first operation instruction includes a first process identification PID, and the first PID represents that the first operation instruction is delivered by a first process in the first container.

Step 220: Determine, according to the first PID, first namespace corresponding to the first container.

Step 230: Delete all processes in the first container according to the first namespace.

Specifically, the dev which is a device file is a directory file in an operating system, and is used to store hardware device information. A kernel may be directly accessed by using the directory. That is, interaction between a user and the kernel needs to be performed by using the dev. Specifically, an operation of a container for the kernel needs to be performed by using the dev. Each container in the at least one container performs an operation on kernel space by using the dev, which is a device file. For example, when the first container needs to perform an open open operation on the watchdog drive of the kernel, the first container needs to send an open operation instruction to the watchdog drive by using /dev/watchdog.

Optionally, an operation of the first container includes at least one of the following: a read operation, a write operation, an open operation, a close operation, or an ioctl operation.

It should be understood that all containers in the at least one container send an operation instruction by using a same dev, and each container does not need to individually correspond to one dev, so as to avoid resource wastes.

Specifically, a process identification (PID) is a process identification number in the operating system. Each running process in the operating system is corresponding to one unique PID. The first PID may represent any process in the first container. Generally, when a container runs a process, a PID of a process that is first run is referred to as the first PID, that is, the first PID of the first container is a PID corresponding to a process that is first run by the first container.

Specifically, the first operation instruction of the first container includes the first PID. Therefore, it can be determined, according to the first PID, that the first operation instruction is delivered by the first process in the first container. It should be understood that the first process may be not the process that is first run in the first container, and may represent any process in the first container.

In step 220, when the watchdog drive receives the first operation instruction that is sent by the first container by using the dev, which is a device file to the watchdog drive, the first PID in the first container can be learned, and namespace (namespace, NS) corresponding to the first container is determined according to the first PID. In a process in which the process is run and deleted in the container, the container is corresponding to fixed namespace NS, and the namespace may separate running processes between containers. For example, when the first container is corresponding to the first namespace, the watchdog drive can delete only all the processes in the first container that is represented by the first namespace. Therefore, the first namespace can ensure that only a process in the first container is processed for the watchdog drive without affecting a process in another container.

Specifically, a process of obtaining the first namespace by using the first PID may be implemented by using a corresponding program and command. For example, when the first container executes the open operation by using /dev/watchdog device, the watchdog drive obtains the first PID of the first container, and may obtain the first namespace by using the following command: struct pid_namespace*pid_ns=task_active_pid_ns (current).

It should be understood that, a process of obtaining the PID corresponding to the container by using the operation of the container for the watchdog drive and a process of obtaining, by using the PID, namespace in which the PID is located may be implemented by invoking a corresponding Linux instruction. This application is not limited to the foregoing listed specific instruction code.

Therefore, without affecting a process in another container, the watchdog drive can delete all processes in a specified container after determining namespace of the container, thereby implementing container-granularity process processing.

Optionally, in an embodiment of this application, before all the processes in the first container are deleted according to the first namespace, the method further includes: establishing, according to the first namespace, a first watchdog instance associated with the first container, where the first watchdog instance is used to delete all the processes in the first container, and the first watchdog instance includes a first timer.

That is, when the first container sends the operation instruction to the watchdog drive by using the dev, the watchdog drive obtains the first namespace of the first container according to the first PID corresponding to the first container, and establishes the first watchdog instance according to the first namespace. The first watchdog instance is used to delete all the processes running in the first container, and the first watchdog instance includes the first timer. When the first container does not perform an operation on the watchdog drive within preset duration of the first timer, a process running in the first container needs to be deleted.

It should be understood that the watchdog drive may include multiple watchdog instances, and each watchdog instance is used to process a container process corresponding to the watchdog instance itself.

It should be understood that the first watchdog instance may further include another attribute of the first container, such as the first namespace and the first PID, and this application is not limited thereto.

For example, structure information of the first watchdog instance is as follows:

```
struct ns_list{
    int pid; // represents a process and an ID,
    int soft_margin;
    int nowayout;
    int soft_noboot;
    int timeout;
    struct timer_list * ns_timer;
    struct pid_namespace * Ppid_ns;
    struct list_head list;
};
``` struct ns_list ns_head;

The soft_margin parameter represents a restart time interval of softdog.ko, a default value is 60 seconds, and the reset time interval may be specified when softdog.ko is loaded, for example, modprobe softdog soft_margin=100.

The nowayout parameter represents a watchdog kernel drive configuration option, for example, 'CONFIG_WATCHDOG_NOWAYOUT' may be set to 'Y'. In this case, the watchdog cannot be stopped after being started. If the nowayout parameter of a module is set to 0, a character "V" is written into /dev/watchdog, so that the watchdog stops working.

When the soft noboot parameter is set to 1, it indicates that a corresponding container is not to be restarted, and 0 represents that a corresponding container needs to be restarted.

Timeout is used to record soft_margin of each instance, where ns_p→timeout=soft_margin; ns_timer represents a timer corresponding to each instance, and Ppid_ns represents pid_namespace corresponding to each instance.

Optionally, in an embodiment of this application, that all the processes in the first container are deleted according to the first namespace includes:

when a second operation instruction sent by the first container is not received within preset duration of the first timer, deleting all the processes in the first container.

Specifically, the first timer is a timer associated with the first container, and the timer has preset duration. For example, the preset duration may be 60 s or 75 s. This application is not limited thereto.

When the second operation instruction sent by the first container is not received within the preset duration of the first timer, all the processes in the first container are deleted. The second operation instruction may represent any operation instruction sent by the first container, that is, if any operation instruction sent by the first container is not received within the preset duration of the first timer, the first watchdog instance instructs a processor to delete all the processes in the first container.

Specifically, the process running in the first container needs to be deleted according to the first namespace corresponding to the first container.

For example, when the process in the first container needs to be deleted, the watchdog drive may invoke the following command: force_sig(SIGKILL,pid_ns→child_reaper), to delete the process according to the first namespace of the first container, and pid_ns in the command represents the first namespace.

Specifically, after the process in the first container is deleted, the first watchdog instance in the watchdog drive is to be deleted, and all corresponding attribute information such as the first timer, the first PID, and the first namespace in the first watchdog instance is to be cleared.

It should be understood that a method for deleting a process in a container according to namespace may be implemented by invoking a corresponding system instruction, and this application is not limited to the foregoing listed specific instruction code.

Optionally, in an embodiment of this application, before all the processes in the first container are deleted according to the first namespace, the method further includes: when a third operation instruction of the first container is received within the preset duration of the first timer, resetting the first timer.

It should be understood that the third operation instruction is any operation instruction delivered by the first container, that is, a trigger condition of the first timer for restarting timing is: The first watchdog instance receives an operation instruction of the first container.

Optionally, in an embodiment of this application, the method further includes: when the first timer times out, or when an exit instruction sent by the first container is received, deleting the first watchdog instance.

That is, in one case, for example, when the preset duration set by the first timer is 60 s, if the first container does not perform any operation on the watchdog drive within the 60 s, and when the first timer times out, the process in the first container needs to be deleted, and all the processes in the first container are further deleted.

In the other case, when the first container actively exits a service, an operation instruction may be sent to the watchdog drive, to instruct the watchdog drive to delete all the processes in the first container.

Optionally, in an embodiment of this application, after all the processes in the first container are deleted, the method further includes: receiving, by using the dev, a fourth operation instruction that is sent after the first container is restarted, where the fourth operation instruction includes a second process identification PID, and the second PID represents that the fourth operation instruction is delivered by a second process in the first container; determining, according to the second PID, second namespace corresponding to the restarted first container; and establishing, according to the second namespace, a second watchdog instance associated with the restarted first container, where the second watchdog instance includes a second timer, and the second watchdog instance is used to delete all processes in the restarted first container when the second timer times out.

That is, after all the processes in the first container are deleted, if the first container is restarted, a new process is run in the first container. After the watchdog drive receives the fourth operation instruction sent by the restarted first container, the second namespace of the restarted first container can be obtained according to the fourth operation instruction, the second watchdog instance is established according to the second namespace, and the second watchdog instance includes the second PID and the second timer.

It should be understood that the fourth operation instruction is any operation instruction sent by the restarted first container.

For example, when the first container is a docker container, after "restart=always" is entered to a docker container start parameter, the docker container is automatically restarted after a daemon of the docker detects that the process in the container is deleted, and sends the fourth operation instruction to the watchdog drive by using the dev, which is a device file. Therefore, the watchdog drive may obtain the second PID in the first container. Generally, the second PID is a PID corresponding to the first process after the first container is restarted.

It should be understood that a process of obtaining the second PID according to the fourth operation instruction is similar to the process in the foregoing embodiment, and details are not described herein. A process of obtaining the second namespace according to the second PID and establishing the second watchdog instance according to the second namespace is also similar to the process in the foregoing embodiment, and details are not described herein either.

It should be further understood that when the process in the restarted first container needs to be deleted, the second watchdog instance sends a corresponding deletion instruction to the first container, all the processes that are running in the first container are to be deleted, and the second watchdog instance is to be deleted subsequently. The process is similar to the process described in the foregoing embodiment, and details are not described herein.

Optionally, in an embodiment of this application, the watchdog drive further includes a third watchdog instance, the third watchdog instance includes a third timer, the third timer is associated with a third container in the multiple containers, and the third watchdog instance is used to determine, according to a third process identification PID delivered by the third container, third namespace corresponding to the third PID, and delete all processes in the third container according to the third namespace.

That is, each container in at least one container in the system is corresponding to one watchdog instance, and the at least one watchdog instance is implemented by a same watchdog drive.

Therefore, without affecting a process in another container, the watchdog instance of the watchdog drive can delete all processes in a specified container by processing the corresponding container, thereby implementing container-granularity process processing.

In addition, because all containers in at least one container send an operation instruction to the watchdog drive by using a same dev, which is a device file, it can be avoided that multiple dev, which is a device files and multiple watchdog drives are required to implement container-level process processing.

FIG. 3 is a schematic structural block diagram of a process processing method according to another embodiment of this application. As shown in FIG. 3, there are three containers in application space, which are respectively a container 1, a container 2, and a container 3. The three containers reset a watchdog timer of a watchdog drive in a kernel by using dev, that is, /dev/watchdog described in the figure. The watchdog drive includes three instances: an NS 1, an NS 2, and an NS 3. The NS 1 instance includes a PID and a first timer of the container 1, the NS 2 instance includes a PID and a second timer of the container 2, and the NS 3 instance includes a PID and a third timer of the container 3.

Specifically, the container 1 is used as an example. When the container 1 performs an operation on the watchdog drive by using a dev, which is a device file, for example, a read, write, or open operation. The watchdog drive can obtain the PID of the container 1 according to the operation of the container 1, and the PID of the container 1 is a PID corresponding to a process that is first run by the container 1.

Further, the watchdog drive can obtain the namespace NS 1 of the container 1 according to the PID of the container 1.

The first timer in the NS 1 instance may be set, for example, may be set to 60 s. That is, when the container 1 resets a watchdog timer of the watchdog drive within 60 s, the first timer is to be reset, and the container 1 is to normally run; and when the container 1 does not reset the watchdog timer of the watchdog within 60 s, the first timer times out and triggers the watchdog drive to send a deletion instruction, that is, deletes all processes running in the container 1. Then, the container 1 can be restarted in response to a corresponding command of an operating system.

After all processes that are running in the container 1 are deleted, the NS 1 instance in the watchdog drive is accordingly deleted.

After the container 1 is restarted, similar to the foregoing step, the watchdog drive newly establishes an instance that is corresponding to a process in the restarted container 1, to monitor the container 1.

It should be understood that each instance is corresponding to a PID of a container and a watchdog attribute. Different container operations are corresponding to different watchdog attributes, just like multiple /dev/watchdog are opened actually. For each operation of a container, the watchdog drive performs the operation according to a PID of the container in a classified manner, and from a perspective of the container, the watchdog is private.

Therefore, without affecting a process in another container, the watchdog instance of the watchdog drive can delete all processes in a specified container by processing the corresponding container, thereby implementing container-granularity process processing.

In addition, because all containers in at least one container send an operation instruction to the watchdog drive by using a same dev, which is a device file, it can be avoided that multiple dev, which is a device files and multiple watchdog drives are required to implement container-level process processing.

Figure 4:
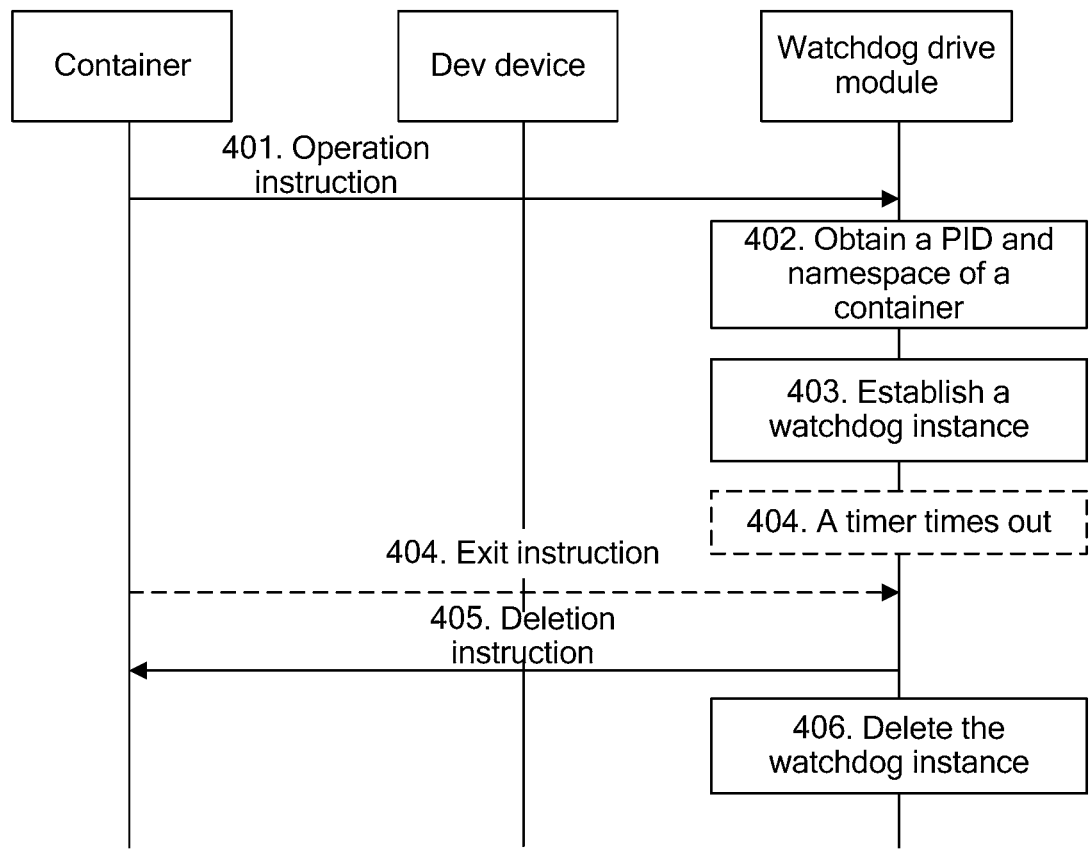
FIG. 4 is a schematic structural block diagram of a process processing method according to another embodiment of this application.

FIG. 4 is a schematic flowchart of a process processing method according to an embodiment of this application.

As shown in FIG. 4, the method includes the following steps.

Step 401: A container sends an operation instruction to a watchdog drive by using a dev, which is a device file, and the operation instruction includes a read, write, open, close, and the like operation instructions. This is not limited in this application.

Step 402: The watchdog drive obtains a PID of the container by using the operation instruction of the container in step 401, and converts the PID of the container into namespace of the container. A process of obtaining the PID of the container and a process of obtaining the namespace are similar to those in the foregoing embodiments, and details are not described herein.

Step 403: The watchdog drive creates a watchdog instance, and the watchdog instance is corresponding to the container, includes the PID of the container and some attributes related to the operation instruction, and further includes a timer. For example, the timer may be set to 60 s.

Specifically, the container sends the operation instruction to the watchdog within 60 s, and then the timer is to be restarted, so that the watchdog drive monitors the container individually.

Step 404: Determine whether one of the following two conditions is met: An exit command that is actively sent by the container to the watchdog drive is received, and the timer of the watchdog instance times out.

Step 405: When one of the foregoing two conditions is met, the watchdog drive is triggered to send a deletion instruction to the container, to delete all processes that are running in the container.

Step 406: The watchdog drive deletes the instance corresponding to the container, and clears the namespace and the like.

It should be understood that the foregoing deletion instruction, the exit instruction, and the like are corresponding instructions of a Linux system, and examples are not further provided herein.

Therefore, without affecting a process in another container, the watchdog instance of the watchdog drive can delete all processes in a specified container by processing the corresponding container, thereby implementing container-granularity process processing.

In addition, because all containers in at least one container send an operation instruction to the watchdog drive by using a same dev, which is a device file, it can be avoided that multiple dev, which is a device files and multiple watchdog drives are required to implement container-level process processing.

Figure 5:
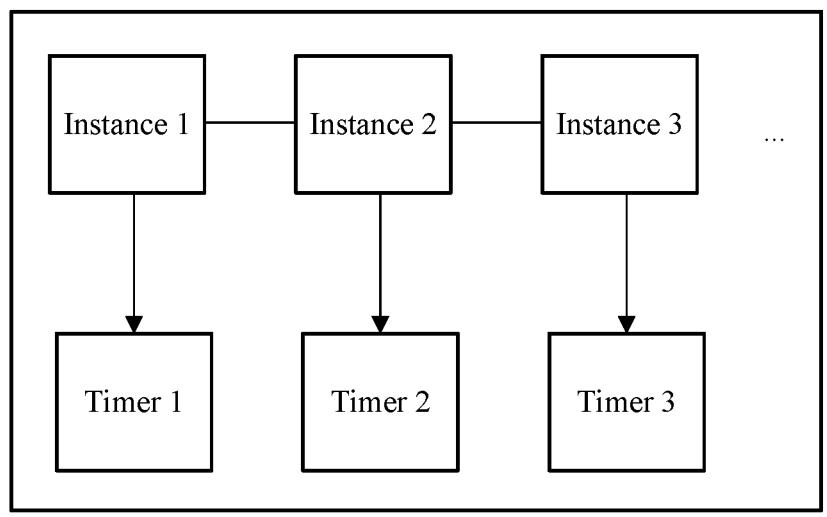
FIG. 5 is a schematic structural block diagram of a process processing method according to an embodiment of this application.

FIG. 5 is a schematic structural diagram of a process processing method according to an embodiment of this application. As shown in FIG. 5, a monitoring drive may include multiple instances. An instance 1, an instance 2, and an instance 3 are listed in the figure. Each instance has one separate timer, for example, the instance 1 is corresponding to a timer 1, the instance 2 is corresponding to a timer 2, and the instance 3 is corresponding to a timer 3.

Specifically, when the container 1 performs an operation on the monitoring drive, the monitoring drive obtains a PID and namespace of the container 1 by using the operation instruction, and establishes the instance 1. The instance 1 includes the PID and the timer 1 of the container 1, and another attribute related to the operation instruction of the container 1. The instance 1 is used to individually monitor running of the container 1. When an abnormality occurs in the container 1, the container 1 is restarted, and the instance 1 is deleted.

After the container 1 is restarted, the monitoring drive re-establishes an instance corresponding to the container 1, such as an instance 4. The instance 4 is associated with a PID of the restarted container 1. A remaining process is similar to the foregoing process, and details are not described herein.

Figure 6:
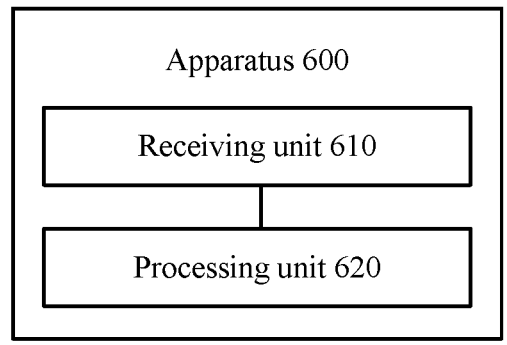
FIG. 6 is a schematic structural block diagram of a process processing apparatus according to an embodiment of this application.

FIG. 6 is a schematic structural block diagram of a process processing apparatus according to an embodiment of this application. As shown in FIG. 6, the apparatus 600 includes:

a receiving unit 610, where the receiving unit 610 is configured to receive a first operation instruction of a first container by using a dev which is a device file, where the first operation instruction includes a first process identification PID, and the first PID represents that the first operation instruction is delivered by a first process in the first container; and a processing unit 620, where the processing unit 620 is configured to determine, according to the first PID, first namespace corresponding to the first container.

The processing unit 620 is further configured to delete all processes in the first container according to the first namespace.

Optionally, in an embodiment of this application, the processing unit 620 is specifically configured to establish, according to the first namespace, a first watchdog instance associated with the first container, where the first watchdog instance is used to delete all the processes in the first container, and the first watchdog instance includes a first timer.

Optionally, in an embodiment of this application, the processing unit 620 is further configured to: when a second operation instruction sent by the first container is not received within preset duration of the first timer associated with the first container, delete all the processes in the first container.

Optionally, in an embodiment of this application, the processing unit 620 is further configured to: when a third operation instruction of the first container is received within the preset duration of the first timer, reset the first timer and restart timing.

Optionally, in an embodiment of this application, the processing unit 620 is further configured to: when the first timer times out, or when an exit instruction sent by the first container is received, delete the first watchdog instance.

Optionally, in an embodiment of this application, the processing unit 620 is further configured to receive, by using the dev, which is a device file, a fourth operation instruction that is sent after the first container is restarted, where the fourth operation instruction includes a second process identification PID, and the second PID represents that the fourth operation instruction is delivered by a second process in the first container.

Optionally, in an embodiment of this application, the processing unit 620 is further configured to: determine, according to the second PID, second namespace corresponding to the restarted first container; and establish, according to the second namespace, a second watchdog instance associated with the restarted first container, where the second watchdog instance includes a second timer, and the second watchdog instance is used to delete all processes in the restarted first container when the second timer times out.

Optionally, in an embodiment of this application, the apparatus further includes a third watchdog instance, the first watchdog instance and the third watchdog instance belong to one watchdog drive, the third watchdog instance includes a third timer, the third timer is associated with a third container in the multiple containers, and the third watchdog instance is used to determine, according to a third process identification PID delivered by the third container, third namespace corresponding to the third PID, and delete all processes in the third container according to the third namespace.

Therefore, without affecting a process in another container, the watchdog instance of the watchdog drive can delete all processes in a specified container by processing the corresponding container, thereby implementing container-granularity process processing.

In addition, because all containers in at least one container send an operation instruction to the watchdog drive by using a same dev, which is a device file, it can be avoided that multiple dev, which is a device files and multiple watchdog drives are required to implement container-level process processing.

Figure 7:
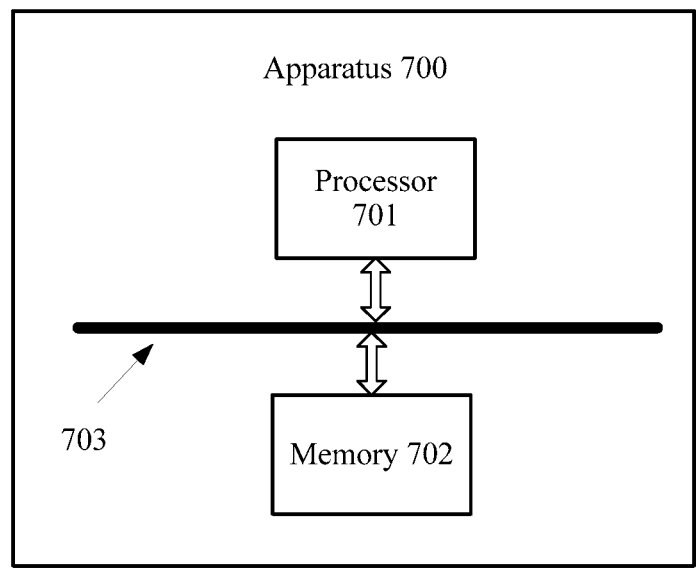
FIG. 7 is a schematic structural block diagram of a process processing apparatus according to an embodiment of this application.

FIG. 7 is an apparatus according to another embodiment of this application. As shown in FIG. 7, the apparatus 700 includes a processor 701, a memory 702, and a bus system 703. The processor 701 is connected to the memory 702 by using the bus system 703, and the memory 702 is configured to store an instruction. The processor 701 is configured to execute the instruction stored by the memory 702, and according to the instruction in the memory 702, implement corresponding functions that can be implemented by the receiving unit and the processing unit in the embodiment shown in FIG. 6.

Specifically, the processor 701 is configured to: receive a first operation instruction of a first container by using a dev which is a device file, where the first operation instruction includes a first process identification PID, and the first PID represents that the first operation instruction is delivered by a first process in the first container; and determine, according to the first PID, first namespace corresponding to the first container; and delete all processes in the first container according to the first namespace.

It should be understood that the apparatus 700 can implement a corresponding procedure in the foregoing method embodiment. To avoid repetition, details are not described herein.

It should be understood that, in this embodiment of this application, the processor 701 may be a Central Processing Unit (CPU), or the processor 701 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor.

The memory 702 may include a read-only memory and a random access memory, and provide an instruction and data for the processor 701. A part of the memory 702 may further include a non-volatile random access memory. For example, the memory 702 may further store information about a device type.

In addition to a data bus, the bus system 703 may include a power bus, a control bus, a status signal bus, and the like. However, for clear description, various types of buses in the figure are marked as the bus system 703.

In an implementation process, the steps of the foregoing methods may be completed by an integrated logical circuit of hardware in the processor 701 or an instruction in a form of software. Steps of the method disclosed with reference to embodiments of this application may be directly completed by a hardware processor, or may be completed by using a combination of hardware and software modules in the processor. The software module may be located in a mature storage medium in the field such as a random access memory, a flash memory, a read-only memory, a programmable read-only memory, an electrically-erasable programmable memory, or a register. The storage medium is located in the memory 702. The processor 701 reads information in the memory 702, and completes the steps of the foregoing method with reference to hardware of the processor 701. To avoid repetition, details are not described herein.

In another apparatus embodiment of this application, the apparatus includes a processor and a bus. The processor is a device such as a digital signal processor (DSP), an application-specific integrated circuit (ASIC), or a field programmable gate array (FPGA). These processors include a unit that has a storage function, such as a storage array or a storage circuit. Therefore, an external memory does not need to be added, and the instruction for implementing the steps in the foregoing method is stored in these units that have a storage function.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a Read-Only Memory (ROM), a Random Access Memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method of processing a process in a container, wherein the method is used in a physical machine, multiple containers are deployed on the physical machine, the physical machine comprises a watchdog drive, and the method comprises:
   receiving, by the watchdog drive, a first operation instruction of a first container by using a dev, wherein the dev is a device file that is a directory file used to instruct a kernel to perform an operation, the first operation instruction comprises a first process identification (PID), and the first PID represents that the first operation instruction is delivered by a first process in the first container;
   determining, according to the first PID, first namespace corresponding to the first container; and
   deleting all processes in the first container according to the first namespace.

2. The method according to claim 1, wherein before the deleting all processes in the first container according to the first namespace, the method further comprises:
   establishing, according to the first namespace, a first watchdog instance associated with the first container, wherein the first watchdog instance is used to delete all the processes in the first container, and the first watchdog instance comprises a first timer.

3. The method according to claim 2, wherein the deleting all processes in the first container according to the first namespace comprises:
   when a second operation instruction sent by the first container is not received within preset duration of the first timer, deleting all the processes in the first container.

4. The method according to claim 2, wherein before the deleting all processes in the first container according to the first namespace, the method further comprises:
   when a third operation instruction of the first container is received within preset duration of the first timer, resetting the first timer.

5. The method according to claim 2, wherein the method further comprises:
   deleting the first watchdog instance when at least one of the following events occurs:
   the first timer times out, or
   an exit instruction sent by the first container is received.

6. The method according to claim 2, wherein after the deleting all processes in the first container, the method further comprises:

receiving, by using the dev, a fourth operation instruction that is sent after the first container is restarted, wherein the fourth operation instruction comprises a second PID, and the second PID represents that the fourth operation instruction is delivered by a second process in the first container;

determining, according to the second PID, second namespace corresponding to the restarted first container; and establishing, according to the second namespace, a second watchdog instance associated with the restarted first container, wherein the second watchdog instance comprises a second timer, and the second watchdog instance is used to delete all processes in the restarted first container when the second timer times out.

7. The method according to claim 2, wherein the watchdog drive further comprises a third watchdog instance, the third watchdog instance comprises a third timer, the third timer is associated with a third container in the multiple containers, and the third watchdog instance is used to determine, according to a third PID delivered by the third container, third namespace corresponding to the third PID, and delete all processes in the third container according to the third namespace.

8. A process processing apparatus, comprising: a memory, configured to store an instruction; and a processor, connected to the memory and configured to execute the instruction stored by the memory, and perform the following steps when the instruction is executed:

receiving, by a drive, a first operation instruction of a first container by using a dev, wherein the dev is a device file that is a directory file used to instruct a kernel to perform an operation, the first operation instruction comprises a first process identification (PID), and the first PID represents that the first operation instruction is delivered by a first process in the first container;

determining, according to the first PID, first namespace corresponding to the first container; and deleting all processes in the first container according to the first namespace.

9. The apparatus according to claim 8, wherein the processor is further configured to:

establish, according to the first namespace, a first watchdog instance associated with the first container, wherein the first watchdog instance is used to delete all the processes in the first container, and the first watchdog instance comprises a first timer.

10. The apparatus according to claim 9, wherein the processor is configured to:

when a second operation instruction sent by the first container is not received within preset duration of the first timer, delete all the processes in the first container.

11. The apparatus according to claim 9, wherein the processor is further configured to:

when a third operation instruction of the first container is received within preset duration of the first timer, reset the first timer and restart timing.

12. The apparatus according to claim 9, wherein the processor is further configured to:

delete the first watchdog instance when at least one of the following events occurs:
the first timer times out, or
an exit instruction sent by the first container is received.

13. The apparatus according to claim 10, wherein the processor is further configured to:

receive, by using the dev, a fourth operation instruction that is sent after the first container is restarted, wherein the fourth operation instruction comprises a second PID, and the second PID represents that the fourth operation instruction is delivered by a second process in the first container;

determine, according to the second PID, second namespace corresponding to the restarted first container; and establish, according to the second namespace, a second watchdog instance associated with the restarted first container, wherein the second watchdog instance comprises a second timer, and the second watchdog instance is used to delete all processes in the restarted first container when the second timer times out.

14. The apparatus according to claim 10, wherein the apparatus further comprises a third watchdog instance, the third watchdog instance comprises a third timer, the third timer is associated with a third container in multiple containers, and the third watchdog instance is used to determine, according to a third PID delivered by the third container, third namespace corresponding to the third PID, and delete all processes in the third container according to the third namespace.

15. A non-transitory computer-readable medium storing computer instructions for processing a process in a container, that when executed by one or more processors, cause the one or more processors to perform operations comprising:

receiving a first operation instruction of a first container by using a dev, wherein the dev is a device file that is a directory file used to instruct a kernel to perform an operation, the first operation instruction comprises a first process identification (PID), and the first PID represents that the first operation instruction is delivered by a first process in the first container;

determining, according to the first PID, first namespace corresponding to the first container; and deleting all processes in the first container according to the first namespace.

16. The non-transitory computer-readable medium according to claim 15, wherein before the deleting all processes in the first container according to the first namespace, the operations further comprise:

establishing, according to the first namespace, a first watchdog instance associated with the first container, wherein the first watchdog instance is used to delete all the processes in the first container, and the first watchdog instance comprises a first timer.

17. The non-transitory computer-readable medium according to claim 16, wherein the deleting all processes in the first container according to the first namespace comprises:

when a second operation instruction sent by the first container is not received within preset duration of the first timer, deleting all the processes in the first container.

18. The non-transitory computer-readable medium according to claim 16, wherein before the deleting all processes in the first container according to the first namespace, the operations further comprise:

when a third operation instruction of the first container is received within preset duration of the first timer, resetting the first timer.

19. The non-transitory computer-readable medium according to claim 16, wherein the operations further comprise:

deleting the first watchdog instance when at least one of the following events occurs:
  the first timer times out, or
  an exit instruction sent by the first container is received.

20. The non-transitory computer-readable medium according to claim 16, wherein after the deleting all processes in the first container, the operations further comprise:
  receiving, by using the dev, a fourth operation instruction that is sent after the first container is restarted, wherein the fourth operation instruction comprises a second PID, and the second PID represents that the fourth operation instruction is delivered by a second process in the first container;
  determining, according to the second PID, second namespace corresponding to the restarted first container; and
  establishing, according to the second namespace, a second watchdog instance associated with the restarted first container, wherein the second watchdog instance comprises a second timer, and the second watchdog instance is used to delete all processes in the restarted first container when the second timer times out.

* * * * *